Patented Aug. 7, 1928.

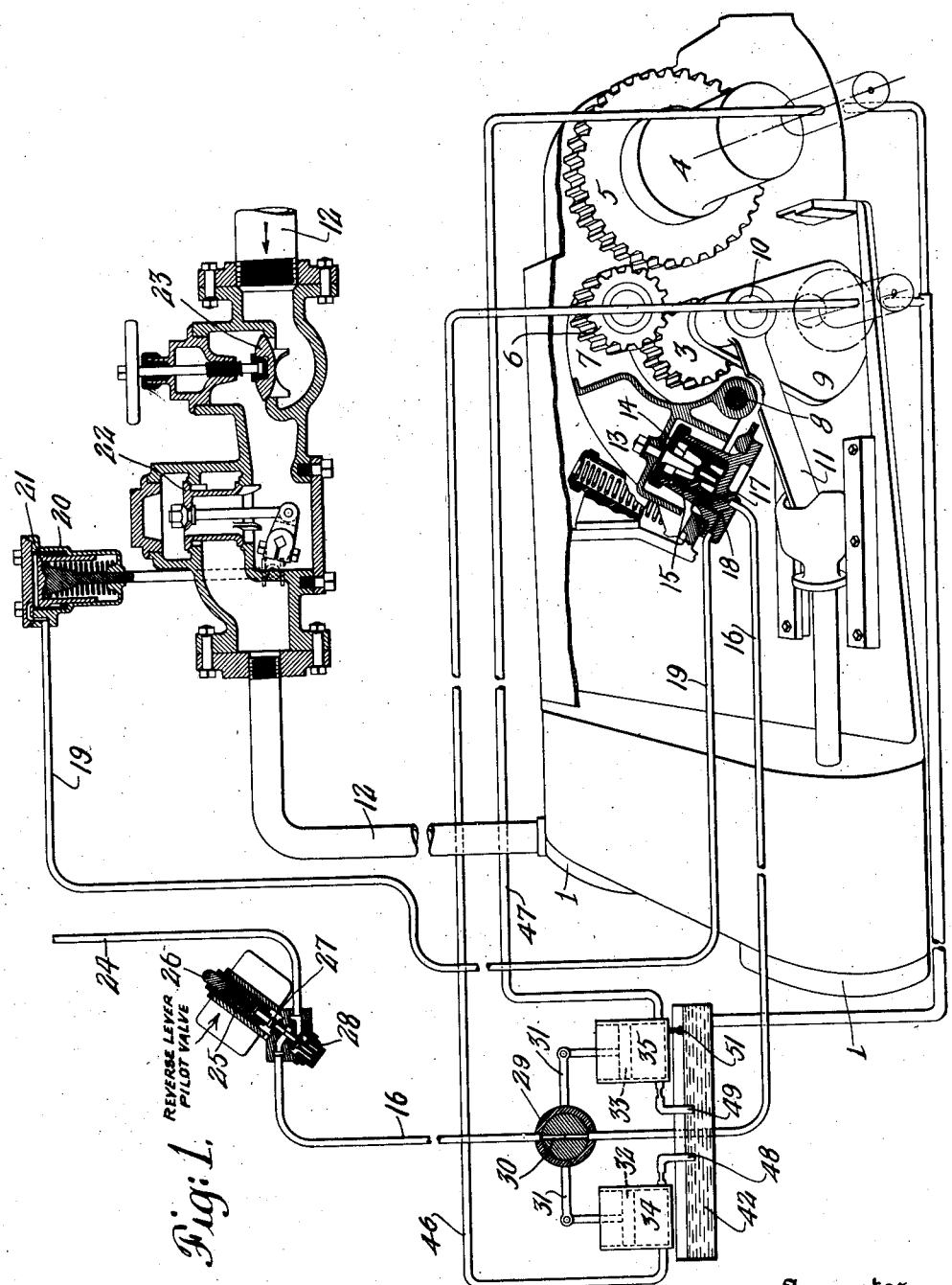

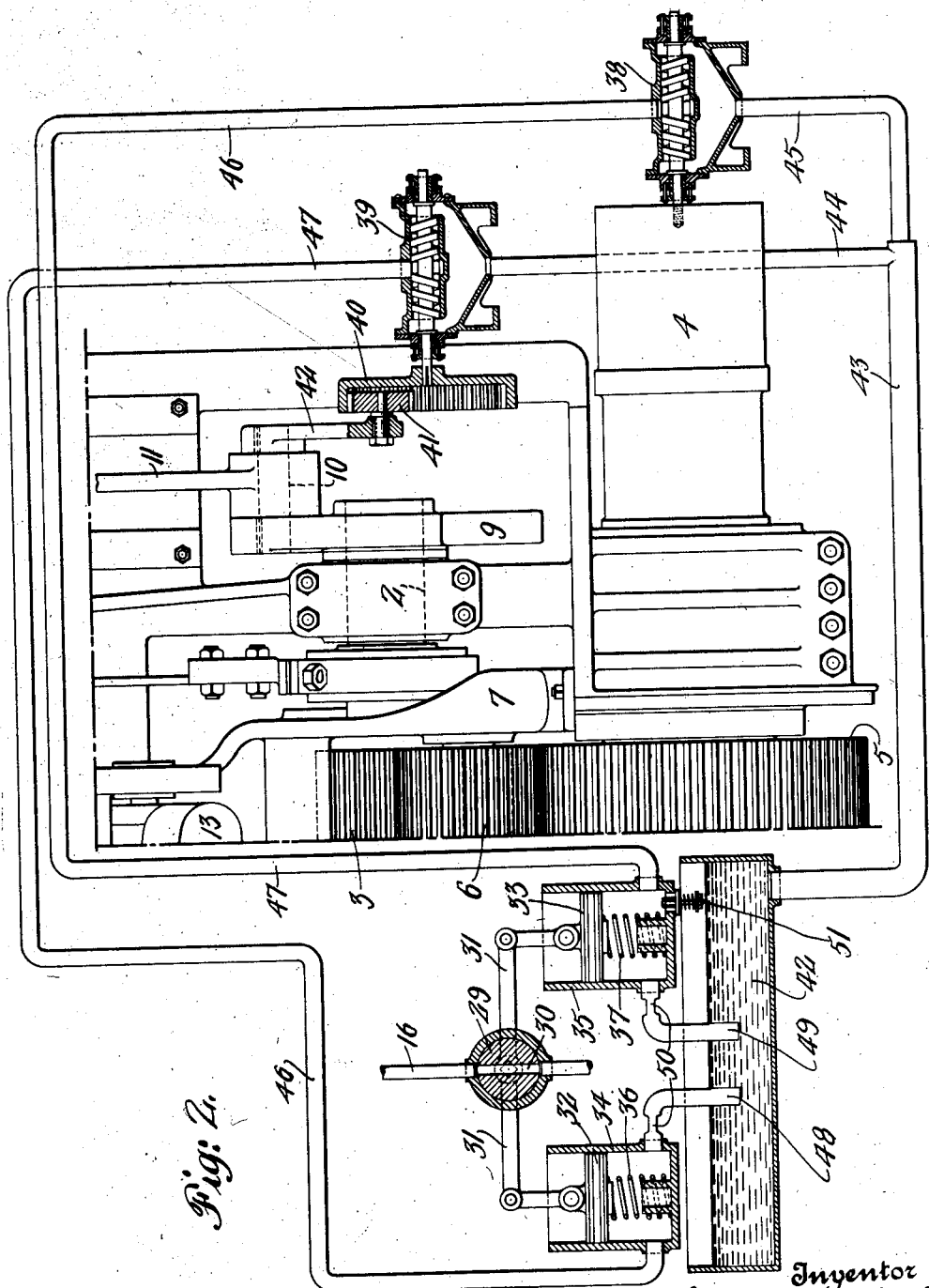

1,679,719

UNITED STATES PATENT OFFICE.

BRODERICK HASKELL, JR., OF NEW YORK, N. Y., ASSIGNOR TO FRANKLIN RAILWAY SUPPLY COMPANY, OF NEW YORK, N. Y., A CORPORATION OF DELAWARE.

ENTRAINMENT-CONTROLLING MECHANISM FOR AUXILIARY MOTORS.

Application filed August 26, 1926. Serial No. 131,559.

This invention relates to auxiliary motors for aiding in the propulsion of a vehicle which is normally driven by some primary power means and it is particularly concerned with motors of this type which have to be connected or disconnected (entrained or disentrained) either while the vehicle is standing still or while it is moving.

The invention has been developed in connection with and is particularly applicable to what is now known in the art as a locomotive booster and I have therefore illustrated and described my invention in a preferred embodiment suitable for this type of apparatus.

As is now well known in the art locomotive boosters are arranged to drive an axle with its wheels which may be located either on the locomotive or on the tender or, in fact, upon any suitable railway vehicle which is normally propelled by some other power. And, since boosters are not intended to operate at all speeds but more especially at slow speeds or in starting, suitable means have been provided for entraining or connecting them to the axle which they drive as well as for disconnecting or disentraining them when their auxiliary power is no longer required or desired.

With the foregoing in mind the principal object of my invention can be stated as involving the provision of means for insuring easy entrainment of the booster motor without the danger of injuring the entrainment mechanism as well as the provision of means for preventing an unintentional or untimely effort to effect entrainment.

Stated more specifically in its direct relation to the booster art my invention involves the provision of means for insuring proper synchronization of the speeds of the idler gear and of the axle gear prior to an entraining operation.

All of the foregoing, however, will be better understood from the following description of the accompanying drawings, wherein Fig. 1 is a diagrammatical layout of my invention as applied to a locomotive booster motor and Fig. 2 is a partial half-plan of a booster motor showing various parts of my improved apparatus diagrammatically applied thereto.

Referring to the drawings it will be seen that the booster is a small twin cylinder steam engine the cylinders 1 of which are arranged to drive the booster crank shaft 2 upon which is fixed a driving pinion 3. The axle 4 to which the booster is to be connected is provided with a large gear 5 which is arranged in the path of movement of the idler gear 6. The idler gear is mounted upon a rocking member 7 and is always in mesh with the driving pinion 3. The rocking member 7 can be swung on its pivot 8 so that gear 6 can be moved into engagement with the axle gear 5. The booster crank shaft 2 is provided at each end with a crank 9 carrying a crank pin 10 over which is secured the usual connecting rod 11.

When the idler gear 6 is moved to the right so as to engage the axle gear 5 and steam is supplied thru the conduit 12, the power of the booster cylinders 1 will be utilized to aid in the propulsion of the vehicle by virtue of the fact that the power developed by the booster is being applied to the axle 4.

Entrainment or connection to the axle 4 is effected by means of the small entraining motor comprehensively indicated at 13. I prefer to use a fluid actuated motor and it comprises in general a piston 14 mounted in a bushing within the cylinder 15. Fluid pressure is delivered to the lower side of the piston 14 thru the conduit 16 and duct 17. When the piston 14 has been raised sufficiently to mesh the idler gear 6 with the axle gear 5 the fluid pressure will then be by-passed thru the duct 18 and conduit 19 to the booster throttle operating cylinder 20 containing the piston 21. This pressure will then depress the piston 21 and open the booster throttle valve 22 in a manner now well understood in this art so that the steam entering in the direction of the arrow thru pipe 12 can pass downwardly to the booster cylinders 1. The globe valve 23 is normally in open position and is manually actuated to close the conduit 12 only in case of accident or repair. The details of the entraining motor 13 and the booster throttle opening mechanism just described form no part of the present invention but are referred to in order that the application of my invention may be better understood. It will be seen from the foregoing that entrainment of the booster is intended to take place prior to the time that the booster becomes an effective driving power.

Fluid pressure, preferably air, is conducted to the pipe 16 thru the conduit 24 leading from an air reservoir, said pipe 24 being under the usual control of the reverse lever pilot valve 25 which will be open to connect pipe 24 to pipe 16 when the plunger 26 is depressed in order to seat the valve 27 and unseat the valve 28.

Before the operating fluid can reach the booster entraining motor 13 I provide the additional controlling mechanism now to be described. In the pipe or conduit 16 which constitutes the means for supplying the motor 13 with motive power, I place a rotary controlling valve 29 having a straight passage 30 therethrough which is adapted to be brought into alignment with the adjacent ends of the pipe 16. Oppositely extending levers or arms 31 are connected to the valve body 29 thru the medium of which the latter can be rotated so as to bring the passage 30 out of alignment with the ends of the pipe 16. One arm 31 is moved by a piston 32 and the other arm 31 by a piston 33. These pistons are normally held in their cylinders 34 and 35 by means of the springs 36 and 37 in such positions as will bring the passage 30 of the valve 29 into straight line communication with the ends of the pipe 16 as shown in the figures. The pistons can be moved by circulating beneath them a fluid under pressure and if this be done it will be apparent that the pressure beneath each cylinder will have to be substantially the same as the pressure in the other in order to establish communication to the pipe 16. I arrange to circulate such a fluid in the following manner.

A screw or other suitable type of rotary pump 38 is driven by the axle 4 and a similar pump 39 is driven by the booster crank shaft 2. The pump 38 is directly driven by the axle 4 and in order to have the direction of rotation and the speed of rotation of the pump 39 the same as that of the pump 38, I arrange to have it driven by means of the internal and external gears 40 and 41, the latter of which is mounted upon the return crank 42 so that its axis will align with the axis of the booster crank shaft 2. The gear 41 being fixed to the return crank 42 it will naturally rotate with the crank shaft 2 and as it rotates it will drive the internal gear 40 at a speed which will substantially correspond to the speed of the axle driven pump 38.

Both pumps draw from the fluid reservoir 42 thru the conduit 43 and branch pipes 44 and 45. The fluid delivered by the pumps is conducted thru the pipes 46 and 47 to the cylinders 34 and 35 respectively, such pipes entering the cylinders near the bottom, well below the pistons 32 and 33. The cylinders have outlet pipes 48 and 49 opposite the pipes 47 and 46 which discharge back into the reservoir 42. There is a Venturi restriction 50 in each discharge pipe by means of which the proper pressure can be built up beneath the pistons 32 and 33.

The operation of the device is as follows. If the railway vehicle axle 4 and the booster crank shaft 2 are at rest the pistons 32 and 33 will be held up by the springs 36 and 37 in positions which will cause the alignment of the passage 30 with the adjacent ends of the pipe 16. Then if the booster pilot valve 26 is depressed air will immediately flow to the entraining piston 14 and cause entrainment of the booster in the manner already described. However should the railway vehicle be running at a slow rate of speed while the booster is idle the pump 38 will develop a pressure below the piston 33 which will raise the right-hand arm 31 and lower the left-hand arm and at the same time move the passage 30 so that it will not establish communication with the pipe 16. By means of a supply of idling steam which is not illustrated in this disclosure since it forms no part of my invention the booster can be rotated or operated and just as soon as its speed corresponds to the speed of the axle 4 the pump 39 will develop a pressure which is substantially equivalent to the pressure developed by the pump 38 and consequently the piston 32 will likewise be raised to balance or offset the previous movement of the piston 33. This will bring the passage 30 into alignment with the ends of the conduit 16. Just as soon as this happens the air will be delivered to the entraining motor 13 and entrainment of the booster will take place without clashing of the gears or other mechanism which might be used to entrain the parts. As already described the sequence of operations will then open the throttle 22 so that full operating pressure for driving the booster will be delivered to the cylinders 1.

It will be seen from the foregoing that I have provided means for preventing any attempt to mesh the booster gears except when their speeds substantially correspond. Furthermore the device can be so set that the engineer cannot cut in the booster when the vehicle is travelling at unusually high speeds at which speeds the booster is not designed for use. In this connection I provide the cylinder 35 with a relief valve 51 so as to relieve the piston 33 of excessive pressure when the railway vehicle is travelling at a high rate of speed. At speeds within which the booster is intended to operate this relief valve 51 performs no function.

My invention also prevents the booster from being thrown into gear while it is being idled in order to clear it of condensation. Furthermore in case of any damage within the booster which would prevent its turning over no entrainment can be accomplished while the locomotive is running. In this way further damage is prevented.

The device is extremely simple and efficient and can be readily applied to existing booster equipments. The pumps 38 and 39 may of course be of any type desired although I prefer to use the screw type illustrated or some other rotary type.

I claim:—

1. The combination of a railway vehicle axle, a booster, entraining mechanism for axle and booster, a motor for actuating said entraining mechanism, and means for preventing operation of said motor prior to synchronization of the speeds of booster and axle.

2. Mechanism for entraining an auxiliary motor with a moving vehicle axle comprising in combination, a gear fixed to the axle, a shiftable gear driven by the motor, fluid pressure actuated means for shifting said gear, a valve for the fluid supply, and means for opening said valve when the speed of the motor and that of the axle substantially correspond.

3. The combination of a railway vehicle axle, a locomotive booster motor, means for entraining the motor with the axle, a pump actuated by the axle, a second pump actuated by the motor, and means controlled by said pumps for preventing entrainment until the speed of the motor and that of the axle substantially correspond.

4. The combination of a railway vehicle axle, a booster, a fluid actuated motor for entraining the booster with said axle, a valve for the fluid supply, and operating means for said valve which is under the combined control of the booster and the axle, said operating means functioning to secure entrainment when the booster speed and the axle speed substantially correspond.

5. Controlling apparatus for the entraining mechanism of a railway vehicle booster motor comprising in combination, a pump actuated by the railway vehicle, a second pump actuated by the booster, and means under the combined influence of both of said pumps for securing entrainment when the vehicle speed and the booster speed substantially correspond.

6. Apparatus for entraining a booster with a moving vehicle axle comprising in combination, a gear on the axle, a shiftable gear driven by the booster, a motor device for shifting said gear and means for initiating the operation of said motor device when the speed of the booster and that of the axle substantially correspond.

7. Apparatus for entraining a booster with a moving vehicle axle comprising in combination, a gear on the axle, a shiftable gear driven by the booster, a fluid pressure motor for shifting said gear, a valve for controlling the supply of fluid thereto, a pump driven by said axle, a second pump driven by said booster, a fluid reservoir, a cylinder and piston construction for moving said valve in one direction, a second cylinder and piston construction for moving said valve in the opposite direction, means for connecting said pumps to the reservoir, means connecting said cylinders to the reservoir, means for connecting one of said pumps to one of said cylinders, and means for connecting the other pump to the other cylinder.

8. Apparatus for entraining a booster with a railway vehicle axle comprising in combination, entraining mechanism including a motor for its operation, means for supplying said motor with motive power, and a controlling means for said motive power supply means, said controlling means including a booster actuated member, an axle actuated member, and a third member forming a part of the motive power supply means and oppositely acted upon by said first two members, said last member functioning to cut off such supply except upon a substantial balance of the effects of said first two members.

In testimony whereof, I have hereunto signed my name.

BRODERICK HASKELL, Jr.